US009846227B2

(12) United States Patent
Mostov

(10) Patent No.: US 9,846,227 B2
(45) Date of Patent: Dec. 19, 2017

(54) MULTI-SENSOR SURVEILLANCE SYSTEM FOR MONITORING A SPACE AND DETECTION OF OBJECTS

(71) Applicant: Kirill Mostov, Berkeley, CA (US)

(72) Inventor: Kirill Mostov, Berkeley, CA (US)

(\*) Notice: Subject to any disclaimer, the term of this patent is extended or adjusted under 35 U.S.C. 154(b) by 267 days.

(21) Appl. No.: 14/775,570

(22) PCT Filed: Mar. 13, 2014

(86) PCT No.: PCT/US2014/026741
§ 371 (c)(1),
(2) Date: Sep. 11, 2015

(87) PCT Pub. No.: WO2014/151965
PCT Pub. Date: Sep. 25, 2014

(65) Prior Publication Data
US 2016/0025846 A1    Jan. 28, 2016

Related U.S. Application Data

(60) Provisional application No. 61/790,783, filed on Mar. 15, 2013.

(51) Int. Cl.
*G01S 13/56* (2006.01)
*G01S 13/04* (2006.01)
(Continued)

(52) U.S. Cl.
CPC ............ *G01S 13/56* (2013.01); *G01S 13/04* (2013.01); *G01S 13/867* (2013.01);
(Continued)

(58) Field of Classification Search
CPC ...... G01S 13/56; G01S 13/886; G01S 13/878; G01S 13/867; G01S 13/04; G01S 13/0209; G06K 9/00771
See application file for complete search history.

(56) References Cited

U.S. PATENT DOCUMENTS 5,831,669 A      11/1998  Adrain
6,243,036 B1 \*   6/2001  Chadwick ............... G01S 7/025
                                                          342/175

(Continued)

OTHER PUBLICATIONS

International Search Report for PCT/US2014/026741 dated Aug. 1, 2014 in 3 pages.

*Primary Examiner* — John B Sotomayor

(57) ABSTRACT

Embodiments of surveillance systems for detecting the presence of unallowed objects in a predetermined restricted space are disclosed. In some embodiments, a surveillance system detects the presence of unallowed objects in a restricted space including a radar having a data output and further having an electromagnetic wave transmitter having at least two output antennas commutated to the transmitter output by means of transmitter switch, an electromagnetic wave receiver having an output and at least two input antennas commutated to the receiver input by means of receiver switch, a control unit operating said transmitter and receiver switches to select a pair of one input antenna and one output antenna at any given time, a video camera adapted to take successive image frames of the restricted space, a signal processor having a radar data input, a camera data input and output, and a storing device connected to the signal processor.

8 Claims, 8 Drawing Sheets

Flow chart of radar data processing unit (11)

(51) Int. Cl.
*G01S 13/86* (2006.01)
*G01S 13/87* (2006.01)
*G06K 9/00* (2006.01)
*G01S 13/88* (2006.01)
*G01S 13/02* (2006.01)

(52) U.S. Cl.
CPC .......... *G01S 13/878* (2013.01); *G01S 13/886* (2013.01); *G06K 9/00771* (2013.01); *G01S 13/0209* (2013.01)

(56) References Cited

U.S. PATENT DOCUMENTS

| | | |
|---|---|---|
| 8,330,647 B2 | 12/2012 | Fox et al. |
| 2004/0130442 A1* | 7/2004 | Breed .................... B60C 11/24 340/443 |
| 2007/0055446 A1 | 3/2007 | Schiffmann et al. |
| 2009/0015460 A1* | 1/2009 | Fox ....................... G01S 7/2922 342/53 |
| 2009/0135051 A1* | 5/2009 | Bishop .................... G01S 13/89 342/175 |
| 2011/0074620 A1 | 3/2011 | Wintermantel |
| 2011/0163904 A1 | 7/2011 | Alland et al. |
| 2012/0092499 A1 | 4/2012 | Klar et al. |
| 2016/0022204 A1* | 1/2016 | Mostov ................ A61B 5/0002 600/301 |
| 2016/0025846 A1* | 1/2016 | Mostov .............. G06K 9/00771 342/28 |

\* cited by examiner

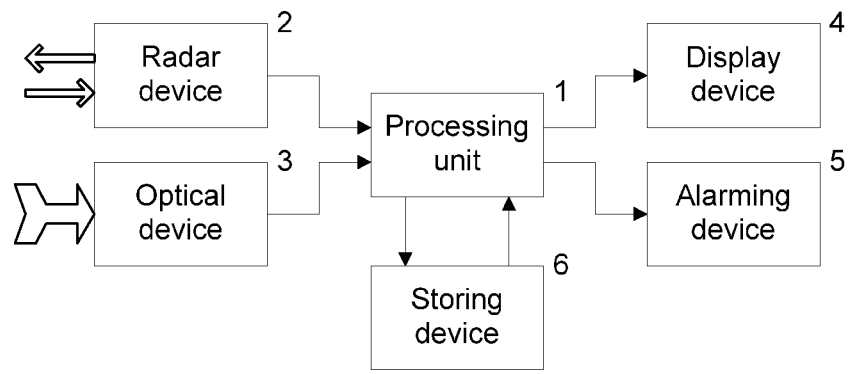
Figure 1. Block diagram of the system for monitoring an enclosed space
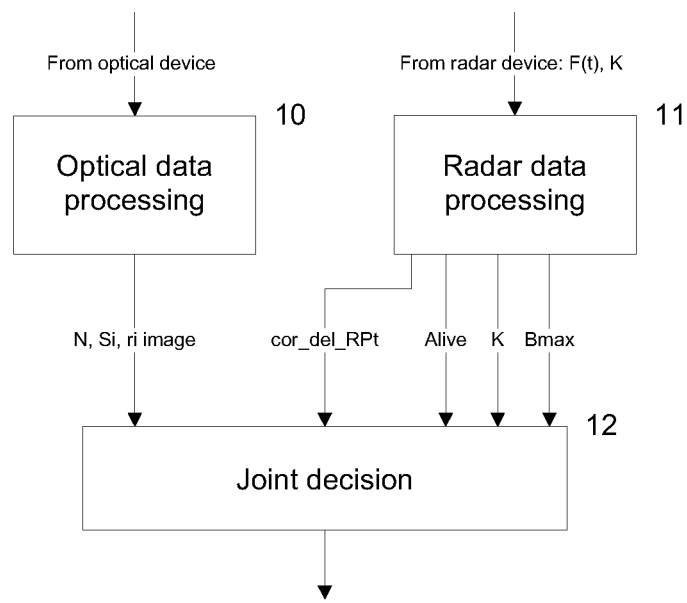
Figure 2. Flow chart of processing unit (1)

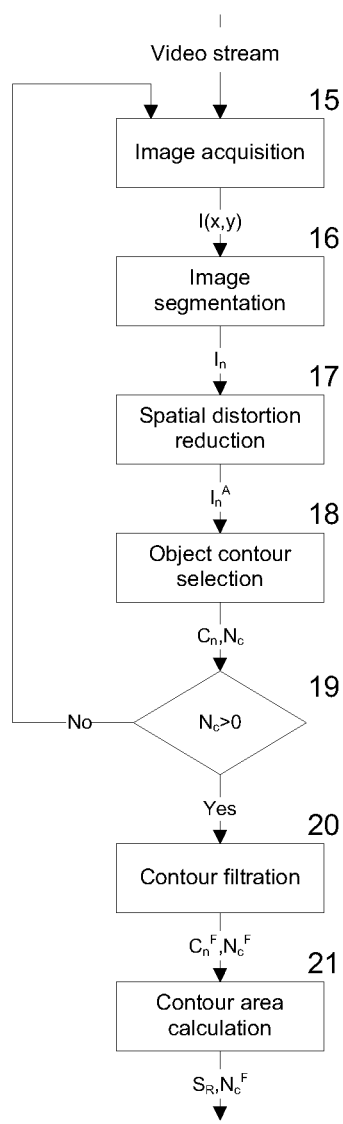
Figure 3. Flow chart of optical data processing unit (10)

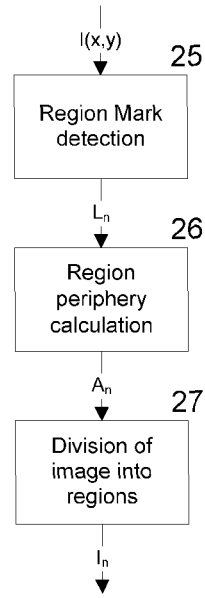
Figure 4. Flow chart of image segmentation unit (16)
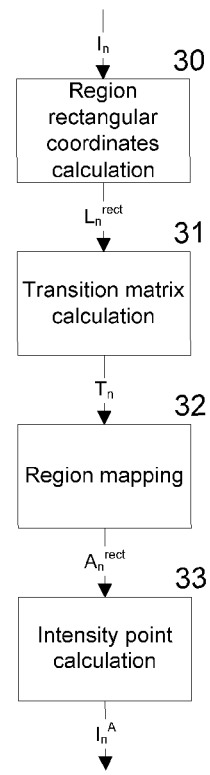
Figure 5. Flow chart of spatial distortion reduction unit (17)

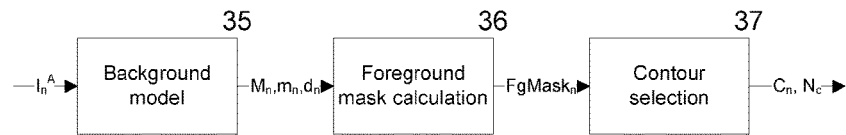
Figure 6. Flow chart of object selection unit (18)
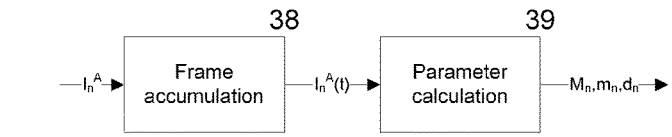
Figure 7. Flow chart of background model construction unit (35)
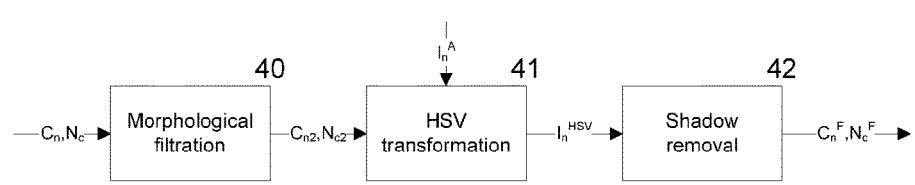
Figure 8. Flow chart of contour filtration unit (20)
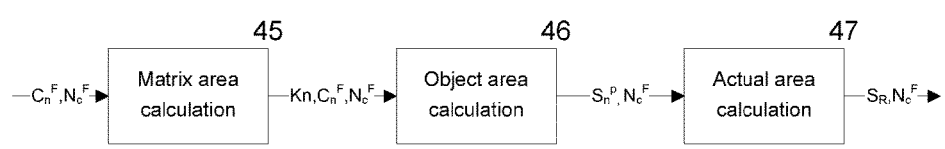
Figure 9. Flow chart of contour area calculation unit (21)
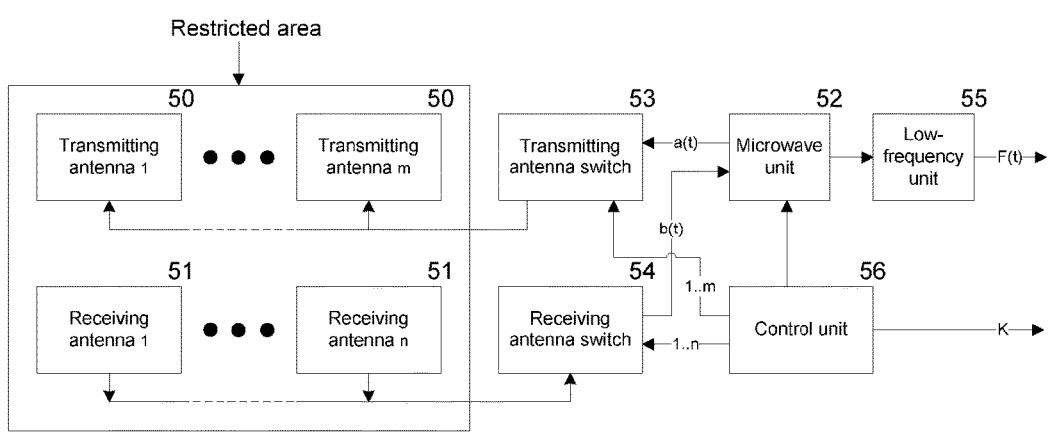
Figure 10. Block diagram of radar device (2)

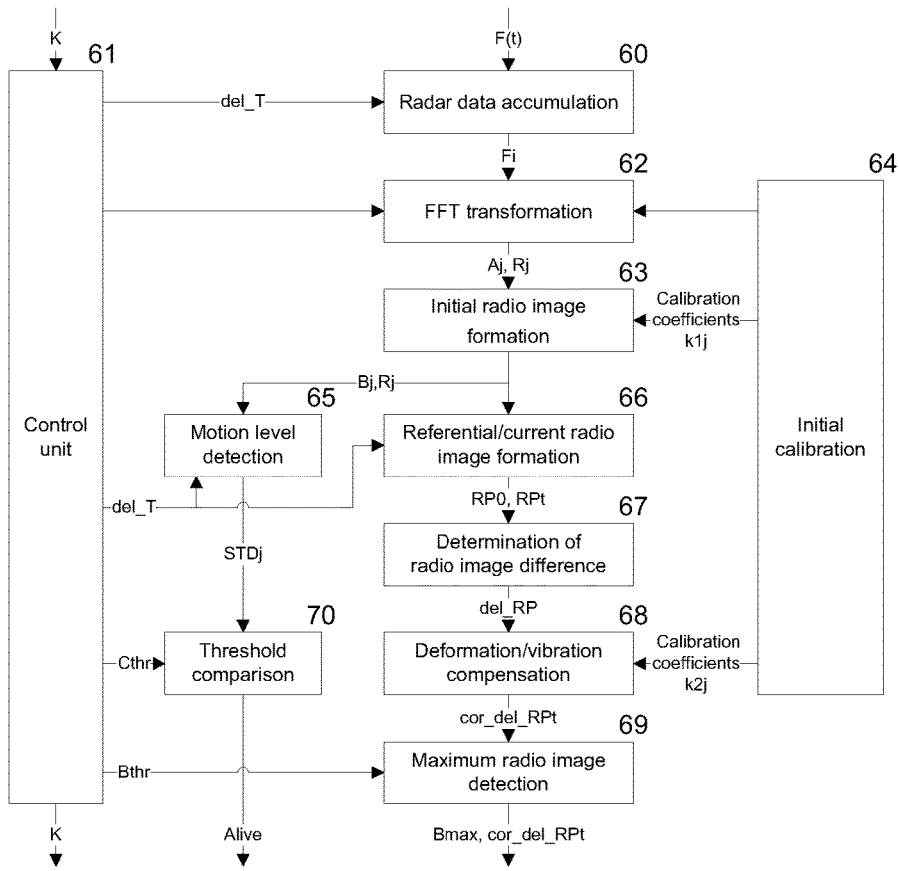
Figure 11. Flow chart of radar data processing unit (11)
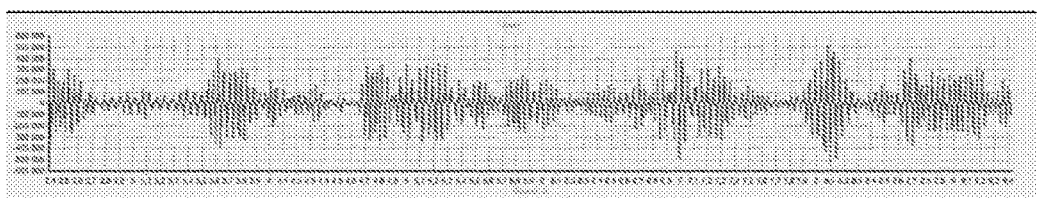
Figure 12. Initial radio image
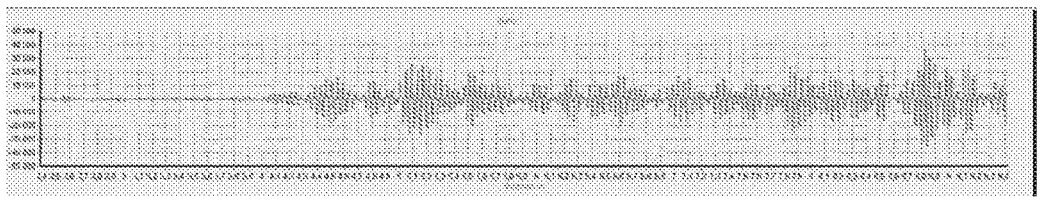
Figure 13. Typical difference of radio images

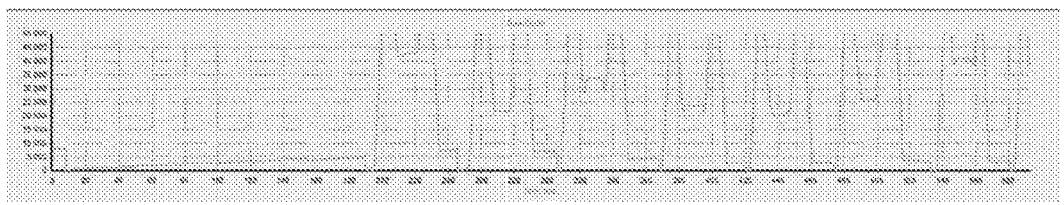
Figure 14. Typical dependence of $\Delta b_{max}$ on time
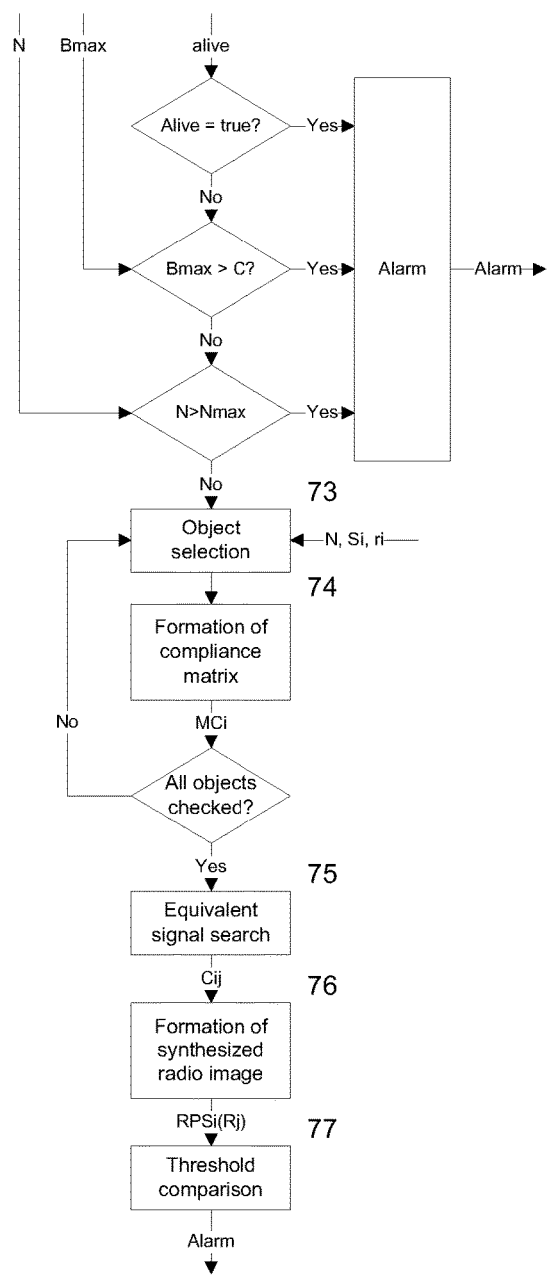
Figure 15. Flow chart of joint decision unit (12)

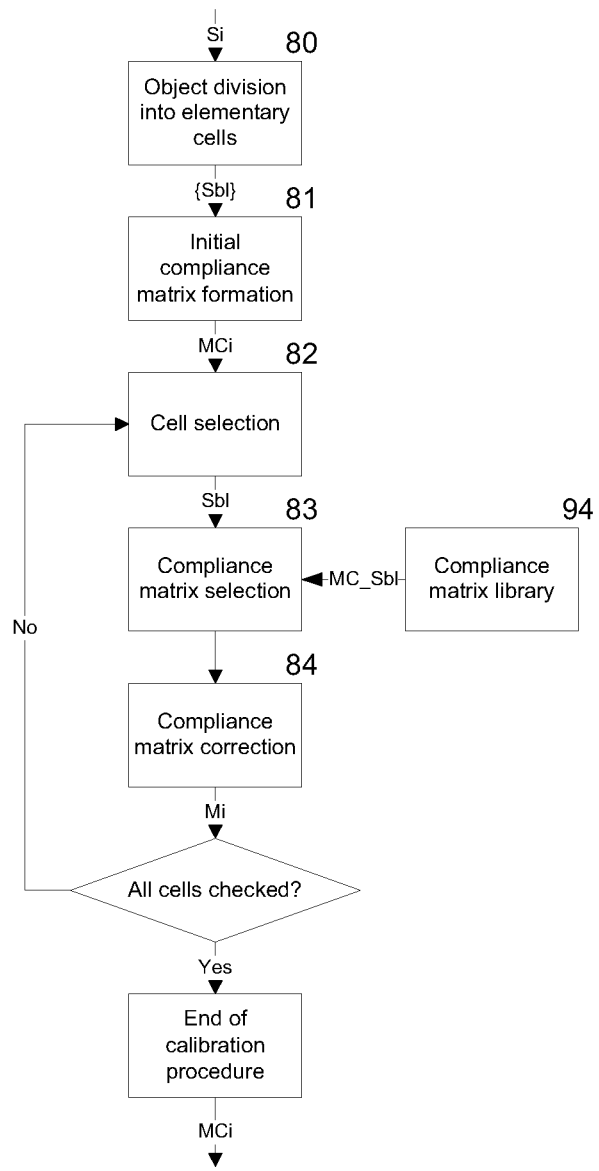
Figure 16. Compliance matrix formation unit (74)

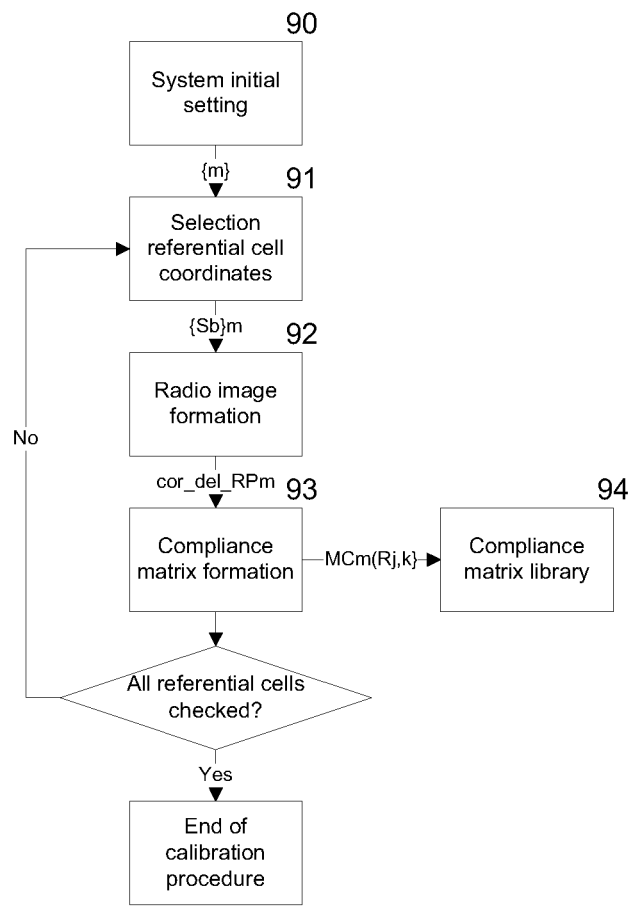
Figure 17. Flow chart of calibration procedure

MULTI-SENSOR SURVEILLANCE SYSTEM FOR MONITORING A SPACE AND DETECTION OF OBJECTS

BACKGROUND OF THE INVENTION

Field of the Invention

The present invention relates to a surveillance system for purposes of detecting the presence of unallowed objects in a predetermined restricted space.

Brief Description of the Prior Art

An ideal security system should have a zero false alarm probability as well as zero missing target probability. Striving to this goal the systems are thoroughly designed starting with sensor physics through sensor data processing to decision making logic. A particular application area of the security system applies its specific requirements to the system. For instance, if some objects potentially detectable as targets are allowed in the surveyed area, they must be recognized properly.

Often a single sensor like passive infrared detector or radar alone cannot provide enough information about alarm condition. Thus multiple sensors are used for capturing the raw data, and more processing power is needed for increased amount of data. This leads to higher complexity and hence higher cost of the security system. An obvious goal is combining the data coming from different types of sensors in the most effective way to achieve high security at reasonable cost.

Alarm conditions can be defined as presence of a living object in the restricted area. This means the system is required to distinguish between living and non-living objects basing on their properties like infrared radiation or body movement due to breathing and heartbeat. Another alarm conditions can be set as changes to some reference picture observed by sensors. In this case the system keeps a set of reference data acquired usually during its deployment time. If the sensors used in the system have high resolution, and the covered area/volume is large, then the amount of data necessary to keep and proceed greatly increases, causing higher complexity and cost of the system.

One example of security system based on more than one type of primary sensors is described in U.S. Pat. No. 8,330,647. It uses at least one radar plus long-wave infrared sensor for detection, tracking, and classification of people and vehicles automatically and in real time for border, property, and facility security surveillance. This system applies a complex algorithm for radar data by means of a supercomputer, however the data from infrared sensor are used mostly by operator for identification of the target. It operates by radar resolution cells without effectively combining radar data with infrared sensors data, or it works on infrared sensor data alone when triggered by possible target detection based on radar data. This system covers a large area, but operates only in two-dimensional plane, and therefore is not good enough for a small restricted area like elevator car.

Another example of security system based on more than one type of primary sensors is described in BG103383, where a combination of radar and video cameras is used, the information from which is summed up in order to obtain a complete and reliable picture of the situation observed in a specific area. For this system the information from different sensors is presented on monitors for an operator who eventually is responsible for making a decision based in this information.

An example of taking into account an environment for radar-based security system is U.S. Pat. No. 7,236,124, where a radar system transmits an environment-sensing pulse, and a processing circuitry time-reverses an order of radar return samples and generates a convolution matrix from the radar return samples resulting from a transmission of the environment-sensing pulse. Then the system radiates a signal generated specifically for this environment. This method effectively extends the dynamic range of the system in terms of its capability to detect small targets whose reflections would otherwise be masked off by reflections from large environment objects situated at the same distance. An obvious drawback is higher complexity since it needs a properly generated radiated signal for each environment instead of a simple pulse.

Another example of taking into account an environment for radar based security system is U.S. Pat. No. 4,197,537, where simple radar with single transmitting antenna is equipped with additional analogue or digital circuit providing its adaptation for environment. Using pre-stored reflected signal data corresponding to secure environment it is then able to detect changes in reflected signal at any distance and comparing them against the reference signal can activate alarm. Albeit simple and inexpensive, this method can't distinguish between living and non-living objects. Also it is equally sensitive to reflection changes coming from different objects situated at the same distance but at different angles. Beside this, multiple reflections produce the same effect as reflection from object at a distance corresponding to the total reflection time. As a result, its spatial resolution is not enough when it operates in restricted space like elevator car.

OBJECT OF THE INVENTION

An objective of the present invention is therefore to provide an effective way of combining output data from different kind of sensors, like radar and video camera, for increasing its reliability, suitable for multiple reflection environment restricted space like elevator car.

SUMMARY OF THE INVENTION

The objective of the invention is attained by providing a surveillance system for detecting the presence of unallowed objects in a restricted space, comprising:

a radar having a data output and further comprising an electromagnetic wave transmitter having at least two output antennas commutated to the transmitter output by means of transmitter switch, an electromagnetic wave receiver having an output and at least two input antennas commutated to the receiver input by means of receiver switch, a control unit operating said transmitter and receiver switches to select a pair of one input antenna and one output antenna at any given time, a video camera adapted to take successive image frames of the restricted space, a signal processor having a radar data input, a camera data input and an output, and a storing device connected to the signal processor, wherein stored in the storing device are: reference data relating to the restricted area and obtained in the absence of any object in the restricted area, sets of parameters of allowed objects, and radar calibration data acquired during calibration process in which for each pair of input and output antennas a predefined test object is located in each radar resolution cell, the signal processor being adapted to detecting the presence of object images in image frames by their contours using the reference data, calculating parameters of each object image and then calculating radar cross-section corresponding to each detected object image using the radar calibration data from the storing device, and comparing calculated parameters of each object image detected in the restricted area image frame against each set of parameters of allowed objects and generating an alarm signal according to this comparison result.

The radar used in the system has multiple transmitting and receiving antennae commutated by means of switches to transmitter and receiver. For each pair of transmitting and receiving antennae commutated by their switches it sends an electromagnetic wave from the transmitter and receives a reflected signal, which is then converted to low frequency and directed to the signal processing unit. Radar control unit provides a full cycle of using each possible pair of receiving and transmitting radar antennas.

A video camera produces a stream of successive image frames of the restricted space, which is then analysed in the signal processor.

The storing device keeps the reference data obtained for the restricted space when no object is present inside it, and also it contains a compliance matrix data acquired during calibration procedure.

From the video stream the signal processor detects contours of object images and then calculates the area of each contour and total number of contours detected. From the radar data the signal processor calculates a total radio image of the objects inside the restricted space and determines whether a living object, such as a human being or an animal, is detected inside the restricted space basing on detection of periodical movements which are characteristic of breathing or heartbeat.

Then the signal processor calculates individual radio image of each visual data object using the the compliance matrix stored in the storing means during calibration procedure. Finally the signal processing means compares calculated parameters of each object image detected in the restricted area image frame against each set of parameters of allowed objects and generates an alarm signal according to this comparison result.

The signal processor can be adapted to provide information about living objects for each antenna pair based on heartbeat or breathing movement detected in radar received signal.

Preferably, appropriate correction is given during radar data processing for vibration and deformations of the surveyed object, optical correction algorithm is performed on contours and areas, and shadows are excluded from object images.

The signal processor and storing device can physically be implemented on a printed circuit board or silicon chip.

BRIEF DESCRIPTION OF THE DRAWINGS

FIG. 1 shows a block diagram of the system for monitoring a restricted space.
FIG. 2 shows a flow chart of processing unit (1).
FIG. 3 shows a flow chart of optical data processing unit (10).
FIG. 4 shows a flow chart of image segmentation unit (16).
FIG. 5 shows a flow chart of spatial distortion reduction unit (17).
FIG. 6 shows a flow chart of object selection unit (18).
FIG. 7 shows a flow chart of background model construction unit (35).
FIG. 8 shows a flow chart of contour filtration unit (20).
FIG. 9 shows a flow chart of contour area calculation unit (21).
FIG. 10 shows a block diagram of radar device (2).
FIG. 11 shows a flow chart of radar data processing unit (11).
FIG. 12 shows an initial radio image.
FIG. 13 shows a typical difference of radio images.
FIG. 14 shows a typical dependence of $\Delta b_{max}$ on time.
FIG. 15 shows a flow chart of joint decision unit (12).
FIG. 16 shows a compliance matrix formation unit (74).
FIG. 17 shows a flow chart of calibration procedure.

DETAILED DESCRIPTION

I. General Flow Chart of the System

The invention relates generally to a system for monitoring a restricted space, such as e.g. an elevator car, and detecting objects therein by using multi-sensor input from contactless sensing devices. Particularly, the multi-sensor input is provided from a radar device (2) and an optical device (3).

FIG. 1 shows a general flow chart of the system for monitoring a restricted space. As shown in FIG. 1, the system for monitoring a restricted space generally comprises processing unit (1), radar device (2), optical device (3), display device (4), alarming device (5) and storing device (6).

Radar device (2) comprises a plurality of channels adapted to operate sequentially. In operation, via a current channel, radar device (2) intermittently emits a probe signal which, upon a number of reflections from surfaces in the restricted space, is received by receiving antennas (51) of radar device (2). Then, a low-frequency signal is detected which is further provided to processing unit (1) as radar input.

Optical device (3) optically senses content of the restricted area and provides video input to processing unit (1).

Processing unit (1) receives input from both optical device (3) and radar device (2), detects objects found inside the restricted space, such as an elevator car, and provides output indicative of presence of living objects (alive) inside the restricted space. Output from processing unit (1) is transferred to display device (4) to display the objects detected inside the restricted space. Optionally, output from processing unit (1) is used to provide an alarm signal through alarming device (5), when a living object is detected inside the restricted space, such as an elevator car, and/or a fused image calculated by using input data from both optical device (3) and radar device (2) exceeds a predefined threshold.

Storing device (6) keeps the reference data obtained for the restricted space when no object is present inside it, and also it contains a compliance matrix data acquired during calibration procedure.

In operation, when no object is inside the restricted space at initial point of time, processing unit (1) receives from radar device (2) a low-frequency signal used as radio input to form a radio image; concurrently, processing unit (1) receives from optical device (3) an initial video image of the content inside the restricted space. The input is stored by processing unit (1) in the storing device (6) as initial reference data. When content inside the restricted space is monitored, processing unit (1) intermittently receives input from both radar device (2) and optical device (3), forms radio image, and compares the received data with the initially stored reference data.

To reliably detect unauthorized objects inside the restricted space and detect their characteristics, processing unit (1) uses input from both radar device (2) and optical device (3), wherein video input from optical device (3) is used to detect location and dimensions of an object inside the restricted space, while radar input from radar device (2) is used to calculate permittivity of the detected object by using scattering cross-section of the object. Reliability of monitoring by the system is ensured by fusion date obtained through both radar device (2) and optical device (3). Processed data are outputted through display device (4) and, optionally, through alarming device (5) as an alarming signal.

FIG. 2 shows a flow chart of processing unit (1).

As shown in FIG. 2, processing unit (1) comprises optical data processing unit (10), radar data processing unit (11), and joint decision unit (12).

Optical data processing unit (10) is used for processing video data received from optical device (3) and for calculating:

a) Quantity (N) of contours used in optical device (3) to define objects detected inside the restricted space, such as an elevator car, b) Area ($S_i$) of the contour corresponding to area of the detected object, c) Video image (W) of the content inside the restricted space.

Radar data processing unit (11) is used for processing radar data received from a current radar channel (K) and for:

a) Calculating a total radio image (R) of the objects inside the restricted space, such as an elevator car; and b) Determining whether a living object, such as a human being or an animal, is detected inside the restricted space.

An object is determined as alive based on detection of periodical movements which are characteristic of breathing or heartbeat.

Joint decision unit (12) is used for making a joint decision based on fusion of input from optical data processing unit (10) and radar data processing unit (11).

II. Processing Data from Optical Device

FIG. 3 shows a flow chart of optical data processing unit (10).

As shown in FIG. 3, optical data processing unit (10) comprises image reception unit (15), image segmentation unit (16), spatial distortion reduction unit (17), object selection unit (18), conditional transition unit (19), contour filtration unit (20), and contour area calculation unit (21).

1. Image Acquisition

In image acquisition unit (15), an input video-stream is decoded and each frame of the video is presented as a two-dimensional function of brightness (intensity) for points thereof: I(x,y), where (x,y) are coordinates of points in the two-dimensional image.

2. Image Segmentation

In image segmentation unit (16), image I(x,y) is segmented into discrete regions, corresponding to e.g. walls, floor, and ceiling, for enabling further geometric transformation of these regions, thus reducing spatial distortions therein caused by an optical camera with a large viewing angle. The segmentation into discrete regions is necessary because amount of distortions in the input image substantially depends on actual location of a particular region. Thus, due to the segmentation, distortions within each segment are minimized. This allows for good restoration of the geometry in each of the selected segments ($I_n$), which is performed in the next processing step. Image segmentation unit (16) is disclosed in grater details with reference to FIG. 4.

3. Reduction of Spatial Distortions Spatial distortion reduction unit (17) is used to reduce geometric distortions in each of the previously selected segments ($I_n$). Such distortions can be spherical distortions and perspective distortions. The distortions are associated with use of wide-angle fisheye camera having a viewing angle close to 180°. These distortions result in distorted shape of objects (e.g., due to spherical distortion, straight lines look like curvilinear lines) and in distorted area of objects (due to perspective distortion, background objects seem to be positioned further than they actually are). Spatial distortions are reduced by using expression:

$$\partial_n(s,v) = Tn * f_n(x,y) \text{ where}$$

$T_n$ is a transition matrix determined when assumed that each of the selected segments ($I_n$) has a rectangular shape, $f_n(x,y)$ is pixel brightness function in the segment n having coordinates (x,y), $g_n(s,v)$ is pixel brightness function in an adjusted segment n having adjusted coordinates (s,v).

Spatial distortion reduction unit (17) is disclosed in grater details with reference to FIG. 5.

4. Selection of Object Contour

In object selection unit (18), objects are detected and selected for each initial image segment $I_n^A$. Then the selected objects are counted. To this end, each of the objects is selected as a contour by means of the following procedures performed sequentially:

1. First, a background model is constructed by using initial image segment $I_n^A$ representative of content of the restricted space before any objects appearing therein. Background model construction is a calibrating procedure performed before any object appears in the restricted space.

During background model construction, the following parameters of background brightness are calculated:

Minimum intensity of background points in time T: $m_n$;

Maximum intensity of background points in time T: $M_n$;

Maximum difference between intensities of background points in time T: $d_n$.

Background model construction is disclosed in grater details with reference to FIG. 7.

2. Then, the objects are detected by using a foreground object mask (FgMask). The foreground object mask for a particular segment is calculated by using background brightness parameters calculated during background model construction. The calculation is disclosed in grater details with reference to FIG. 6.

5. Conditional ($N_c > 0$) Transition

Conditional ($N_c > 0$) transition unit (19) is used for checking quantity of detected contours and returning into original state if no contours are detected. To this end, background brightness parameters are re-calculated and background model is updated so as to improve further iterative calculations. The background brightness parameters are updated in order to adjust the parameters in view of possible changes of the background to provide a better selection of objects during a following procedure:

$$m_n^{new}=(1-a)\cdot m_n^{old}+a\cdot \min(I_n^A(t)),$$

$$M_n^{new}=(1-a)\cdot M_n^{old}+a\cdot \max(I_n^A(t)),$$

$$d_n^{new}=(1-a)\cdot d_n^{old}+a\cdot \max(I_n^A(t)-I_n^A(t-1)), \text{ where}$$

a is a refresh rate for background brightness parameters. The rate is set manually as 0 or 1, $m_n^{old}$, $M_n^{old}$, $d_n^{old}$ are parameters used during a previous iterative calculation.

6. Filtration of Contours

In contour filtration unit (20), the contours are filtered in order to improve their parameters, i.e.: refine their peripheries, remove discontinuities, remove parasitic contours caused by noise from camera and by shadow effects. In contour filtration unit (20), foreground object mask (Fg-Mask) is morphologically filtered so as to remove noise and adjust parameters of the contours. In addition to morphological filtration, pixels of the object are compared with corresponding pixels found in the background. It is to be taken into account that points in shadow region retain their hue and saturation, only their brightness is changed; therefore, based on change in brightness, these points can be excluded from the object contour, thus improving accuracy of the calculation. This allows for detection and removal of shadows. The result is a new array of filtered contours $C_n^F$. Contour filtration unit (20) is disclosed in grater details with reference to FIG. 8.

7. Calculation of Contour Area

In contour area calculation unit (21), area of each detected contour is calculated to yield a value in cm² by using area transformation coefficient matrix ($K_n$) obtained during calibration at step 1 as described below. Area of each detected contour is calculated in two sequential steps:

Step 1. Calculation of area transformation coefficients during initial calibration of optical device (3). The calculation is performed once for a given type of cameras, their arrangement, and orientation of a particular camera inside the monitored restricted space. Area transformation coefficients are calculated by using patterns of previously known area ($S_e$) and an area of detected and filtered contours $C_n^F$ (in fact, the area is considered to be quantity of points in a particular region) ($S_n^P$). To calculate the area in points outside the patterns, the entire image of segment n is divided into regions according to area values of patterns adjacent to the regions. This is done by using k-mean segmentation algorithm. Then, area transformation coefficient matrix for each segment n is calculated as:

$$K_n(x,y)=\frac{S_e}{S_n^P(x,y)},$$

Step 2. Calculation of actual area of objects during regular operation of the system Calculation of actual area of objects during regular operation of the system is disclosed in grater details with reference to FIG. 9.

Further, the units used in the data processing unit are described in grater details.

Image Segmentation Unit (16)

FIG. 4 shows a flow chart of image segmentation unit (16).

As shown in FIG. 4, image segmentation unit (16) comprises region mark detection unit (25), region periphery calculation unit (26), and image division unit (27).

1.1 Detection of Region Marks in an Image

In region mark detection unit (25), four corner points are sequentially detected along the periphery of the region (e.g., four corners of the wall, when a wall region is processed) for each of the regions in the image. Thus, output from region mark detection unit (25) is an array (4×N) of points ($L_n$), where N is quantity of regions.

1.2 Calculation of Region Periphery

In region periphery calculation unit (26), a four angular periphery of the region and all points thereof ($A_n$) are calculated by using the coordinates of four points in each region and shape of the regions (in this case, rectangular). To this end, a quadrangle is calculated by means of expression:

$y=k_p x+b_p$, where $k_p$ and $b_p$ are side coefficients of a quadrangle p, and then all points within the quadrangle are considered.

1.3 Division of an Image into Regions

In image division unit (27), an input image ($A_n$) is subdivided into regions, thus producing an output image ($I_n$).

Spatial Distortion Reduction Unit (17)

FIG. 5 is a flow chart of spatial distortion reduction unit (17) As shown in FIG. 5, spatial distortion reduction unit (17) comprises region rectangular coordinates calculation unit (30), transition matrix calculation unit (31), region mapping unit (32), and intensity point calculation unit (33).

1.1 Calculation of Rectangular Coordinates in Region

In region rectangular coordinates calculation unit (30), area of each image segment n is calculated, then a rectangle having the same area is calculated, then coordinates of its corners (s,v) are calculated, the coordinates being stored in an array $L_n^{rect}$.

1.2 Calculation of Transition Matrix

In transition matrix calculation unit (31), least squares method is used to calculate transition matrix. The calculation is based on minimizing the sum of least squares residuals. In this case, parameters (coefficients) of the transformation are the variables which are subject to minimization. Thus, output from transition matrix calculation unit (31) is transition matrix $T_n$.

1.3 Mapping of Regions

In region mapping unit (32), a new point (s,v) in the new (rectangular) region is calculated for each point (x,y) in the initial segment of image n by using the transfer matrix:

$$\begin{bmatrix}s\\v\\1\end{bmatrix}=Tn*\begin{bmatrix}x\\y\\1\end{bmatrix}$$

Output from region mapping unit (32) is a new rectangular segment of image n having reduced distortions $A_n^{rect}$.

1.4 Calculation of Intensity at Points

In intensity point calculation unit (33), intensity of the new points (s,v) is calculated. Brightness (intensity) of the point after mapping (g(s,v)) is calculated based on image of original region n by using bilinear interpolation. When using bilinear interpolation, brightness of the point is calculated by taking into account brightness of its neighboring points, i.e. points adjacent thereto:

$$g(x,y)=ax+by+cxy+d,$$

where coefficients a, b, c, and d are determined from equations for a given neighboring point.

Output from intensity point calculation unit (33) is image vector:

$$I_n^A=\{(g(s,v)|(s,v)=T(x,y),(x,y)\epsilon A_N\},$$

where n is a selected segment of the image.

Background Model Construction Unit (35)

FIG. 7 is a flow chart of background model construction unit (35).

As shown in FIG. 7, background model construction unit (35) comprises frame accumulation unit (38) and parameter calculation unit (39).

1. Frame Accumulation Unit

Background model is constructed during time period (T), when nothing is inside the monitored restricted space. During the time period (T), input image frames $I_n^A(t)$ are accumulated in frame accumulation unit (38).

2. Parameter Calculation

In parameter calculation unit (39), parameters of the monitored restricted space containing no unauthorized objects are calculated.

These parameters are:

minimum intensity of background points in time T:

$$m_n=min(I_n^A(t)),$$

maximum intensity of background points in time T:

$$M_n=max(I_n^A(t)),$$

maximum difference between intensities of background points in time T:

$$d_n=max(I_n^A(I)-I_n^A(t-1))$$

Object Selection Unit (18)

FIG. 6 is a flow chart of object selection unit (18)

As shown in FIG. 6, object selection unit (18) comprises background model construction unit (35), foreground object mask calculation unit (36), and contour selection unit (37).

1. Background Model

In background model construction unit (35), parameters of the monitored restricted space are calculated as described above with reference to FIG. 7.

2. Calculation of Foreground Object Mask

In foreground object mask calculation unit (36), mask of foreground objects is calculated. Mask of foreground objects is a binary mask wherein 1 corresponds to the points of changed image and 0 corresponds to the points of no change. The following formula is used for calculation of the mask:

$$FgMask_n(x,y) = \begin{cases} 1, & \begin{cases} mean_n(x,y)-M_n(x,y)>d_n(x,y), mean_n(x,y) \geq M_n(x,y) \\ m_n(x,y)-mean_n(x,y)>d_n(x,y), mean_n(x,y) < m_n(x,y) \end{cases} \\ 0, & else \end{cases}$$

where $mean_n(x,y)$ is a mean intensity over a time T for a point having coordinates (x,y) in a rectangular segment of image n.

3. Selection of Contour

In contour selection unit (37), the previously calculated mask is used and peripheries (F) coordinates of each object are calculated and recorded in circuit array ($C_n$):

$$C_n=\{(x,y)|(x,y)\epsilon\Gamma\epsilon A_n\},$$

Output from contour selection unit (37) is selected object circuit array ($C_n$), quantity of selected contours $N_c$, and image vector $I_n^A$ used to further remove shadows in contour filtration unit (20).

Contour Filtration Unit (20)

FIG. 8 is a flow chart of contour filtration unit (20)

As shown in FIG. 8, contour filtration unit (20) comprises morphological filtration unit (40), HSV transformation unit (41), and shadow removal unit (42).

1. Morphological Filtration

In morphological filtration unit (40), each point (z) in contour $C_n$, with structural element in the form of disk having diameter d for points (B=DISK (d)), is sequentially subjected to morphological operations of erosion ($C_n \ominus B=\{z\epsilon C_n|B_z\cup C_n\}$) to remove noise and of dilation $C_n \oplus B=U_{3\epsilon B}C_x(z)$) to close gaps in the circuits. Output from morphological filtration unit (40) is a new array of contours $C_{n2}$ and quantity $N_{c2}$, generally $N_{c2} \leq N_c$.

2. Transformation to HSV Model

In HSV transformation unit (41), an initial background image and an image containing the objects ($I_n^A$) are transformed from an RGB color model (each point is represented by three components: red, green, blue) to an HSV color model (each point is represented by three components: hue, saturation, brightness) using the formulae given below:

Assume that $$:H\epsilon[0,360)S,V,R,G,B\epsilon[0,1]$$

Let MAX is a maximum value from R, G, and B, while MIN is a minimum value therefrom.

$$H = \begin{cases} 0, & if\ MAX=MIN \\ 60 \times \frac{G-B}{MAX-MIN}+0, & if\ MAX=R\ and\ G \geq B \\ 60 \times \frac{G-B}{MAX-MIN}+360, & if\ MAX=R\ and\ G<B \\ 60 \times \frac{B-R}{MAX-MIN}+120, & if\ MAX=G \\ 60 \times \frac{R-G}{MAX-MIN}+240, & if\ MAX=B \end{cases}$$

$$S = \begin{cases} 0, & if\ MAX=0 \\ 1-\frac{MIN}{MAX}, & otherwise \end{cases}$$

$$V = MAX$$

Output from HSV transformation unit (41) is an HSV image $I_n^{Hsv}$.

3. Removal of Shadows

In shadow removal unit (42), shadows are removed by using images of background and frames containing objects represented as HSV ($I_n^{HSV}$) inputted from model transformation unit (41). To this end, a binary shadow mask (SP) is produced, wherein shadow points are assigned to 1, while other points are assigned to 0:

$$SP(x, y) = \begin{cases} 1, & \text{if } \alpha \leq \frac{I_c^V(x, y)}{B_c^V(x, y)} \leq \beta \\ & \wedge (I_c^S(x, y) - B_c^S(x, y)) \leq \tau_S \\ & \wedge |I_c^H(x, y) - B_c^H(x, y)| \leq \tau_H \\ 0, & \text{otherwise} \end{cases}$$

where $I_c^H$, $I_c^S$, $I_c^V$ are images from each of the three channels in a HSV model comprising objects in the points of contour $C_{n2}$, $B_c^H$, $B_c^S$, $B_c^V$ are images from each in the three channels in a HSV model of the background in the points of contour of $C_{n2}$, α,β, s are threshold sensitivity coefficients for determining the shadows, selected manually.

Then, shadow points are excluded from image contours. Output from shadow removal unit (42) is filtered circuit array $C_n^F$ and quantity of circuits $N_c^F$ remaining after the filtration, generally $N_c^F \leq N_{c2}$.

Calculation of Contour Area

FIG. 9 is a flow chart of contour area calculation unit (21). As shown in FIG. 9, contour area calculation unit (21) comprises area matrix calculation unit (45), object area calculation unit (46), and actual area calculation unit (47).

1. Calculation of Area Matrix

In area matrix calculation unit (45), coefficient matrix is preliminary provided as described above.

2. Calculation of Object Area

In object area calculation unit (46), area of contour object is calculated in pixel by counting quantity of pixels in each contour (V) and for each rectangular image segment n.

3. Provision of Actual Area

In actual area calculation unit (47), actual area of the object is calculated by using formula:

$S_R = K_n(x,y) * S_n^P(x,y)$ where (x,y) are coordinates of the contour center in the rectangular image segment n. Output from actual area calculation unit (47) is an array of actual areas $S_R$ of objects and quantity $N_c$ of objects.

III. Radar Device

FIG. 10 shows a block diagram of radar device (2).

As shown in FIG. 10, radar device (2) comprises transmitting antennas (50), receiving antennas (51), microwave unit (52), transmitting antenna switch (53), receiving antenna switch (54), low-frequency unit (55), and control unit (56).

1. The m transmitting antennas (50) and n receiving antennas (51) of radar device (2) are positioned inside the restricted area. Only one from the transmitting antennas (50) and one from the receiving antennas (51) are active at a given point of time, thus defining an ordinal number of a current channel (K) via which radar device (2) is operated. By enabling any of the m transmitting antennas (50) and any of the n receiving antennas (51), n*m combinations can be provided, i.e. $K_{max}$=n*m channels can be provided, via which radar device (2) is sequentially operated.

2. In microwave unit (52), a probe signal a(t) is formed, which is fed into one of the transmitting antennas (50) via transmitting antenna switch (53). A signal emitted by transmitting antenna (50) undergoes multiple reflections inside the restricted space and becomes indicative of what is inside the restricted space. Then, the signal b(t) is received by one of the receiving antennas (51) which, at this point of time, is coupled to microwave unit (52) through a controllable receiving antenna switch (54).

3. In low frequency unit (55), the received signal b(t) is mixed with the initial (probe) signal a(t) to detect a low-frequency component F(t) of the input signal.

4. The provided low-frequency signal and the number of a current radar channel (K) from control unit (56) are inputted to radar data processing unit (1).

5. Control unit (56) provides sequential switching for all of the transmitting and receiving antennas. In doing this, only m*n channels working sequentially in time are used so as working diagrams of the channels do not intersect. In this case, number of the current channel is sequentially changed from 1 to m*n. Then, this sequentially change is recurrently repeated.

IV. Procession of Radar Data

FIG. 11 shows a flow chart of radar data processing unit (11). Radar data processing unit (11) is used for processing radar data received from a current radar channel defined by assigned numbers of the transmitting (n) and receiving (m) antennas coupled thereto.

Radar data processing unit (11) comprises radar data storing unit (60), control unit (61), FFT unit (62), initial radio image formation unit (63), initial calibration unit (64), motion level detection unit (65), referential and current radio image formation unit (66), difference determination unit (67), compensation unit (68), maximum radio image detection unit (69), and threshold comparison unit (70).

In use:

1. A continuous low-frequency signal F(t) is inputted to radar data accumulation unit (60). Control unit (61) provides reading of the input signal during time interval ΔT, converting the signal into digital form by using an analog-to-digital converter, and storing digital data array $(F_i)$. Upon accumulation, the digital data array $(F_i)$ is transferred to FFT unit (62) by signal from control unit (61) and radar data accumulation unit (60) is used for reading, converting, and accumulating data for the next time interval ΔT.

2. In FFT unit (62), Fast Fourier Transform is applied to the digital data array $(F_i)$, thus yielding output of an amplitude array $(A_j)$ calculated for a given set of distance samples $(R_j)$.

3. For enabling optimal choice of signal-to-noise ratio which takes into account dimension and configuration of the monitored restricted space, initial radio image formation unit (63) provides multiplying the amplitude array $(A_j)$ by weight function $W_j$ which depends on the number of current radar channel (K). The weight function $W_j$ has been previously determined in initial calibration unit (64) for each of the radar channels. Then, corrected amplitudes $B_j = A_j \cdot W_j$ and distance samples $(R_j)$ are received for processing in motion level detection unit (65) and referential and current radio image formation unit (66).

FIG. 12 shows a typical initial radio image $(B_j, R_j)$. In FIG. 11, the horizontal axis represents distance samples $(R_j)$, the vertical axis represents corrected amplitudes $(B_j)$.

4. In referential and current radio image formation unit (66), signals from control unit (61) are used to form a referential radio image and a current radio image.

a) Referential radio image $(RP_0)$ is formed by taking the content of the restricted space as a referential value. The formation is effected by accumulating an array of initial radio images $(B_j),(R_j)$ sequentially formed in initial radio image formation unit (63) during a time period Δt (generally, 3-5 sec). Upon accumulation, $(B_j)$ is averaged per each of the distance samples ($R_j$). Thus formed referential radio image ($RP_0$) is stored as a referential radio image.

b) Current radio image ($RP_t$) is formed when the system is operated for monitoring the restricted space. The formation of current radio image is effected similarly to one of referential radio image, i.e. by step of accumulating during a time period $\Delta t$ followed by step of averaging.

5. In difference determination unit (67), difference (del_$RP_t$) is determined by comparing current radio image ($RP_t$) with previously stored referential radio image ($RP_0$). The determination is effected by successive subtraction current radio image from referential radio image for each distance sample ($R_j$). Thus, ($\Delta B_j$) is obtained for each ($R_j$). FIG. 13 shows a typical difference of radio images.

6. Compensation unit (68) provides accounting for characteristics of the monitored restricted space related to different vibrations and residual deformations which appear when structure of the monitored restricted space is mechanically affected. The vibrations and residual deformations can appear when the restricted space, such as an elevator car, moves between floors in a building, when doors of the elevator car are closed or opened, etc. The vibrations and residual deformations are taken into account and compensated by multiplying values of $\Delta B_j$ by calibration coefficients $k2_j$: $\Delta b_j = k2_j \cdot \Delta B_j$.

This transformation is performed for each distance sample ($R_j$). Calibration coefficients $k2_j$ have been obtained during initial calibration. Thus, use of the calibration coefficients can reduce impact of those parts and local areas in the monitored restricted space which are subjected to substantial mechanical deformation and vibration. Output from compensation unit (68) is a corrected difference of radio images which eliminate influence of deformation and/or vibration: cor_del_$RP_t = \{cor\_del\_b_j\}$.

7. In maximum radio image detection unit (69), maximum deviation of the current radio image from referential radio image is determined. To this end, a maximum (absolute) value from all of the distance samples ($R_j$) is determined:

$$b_{max} = \max_j \{cor\_del\_b_j\}$$

which is compared with a predefined threshold level $B_{max}$ to detect presence or absence of unauthorized objects. This serves as a tentative (autonomous) indication which can be used by the system to issue an alarm signal. FIG. 14 shows a typical function $\Delta b_{max}(t)$.

8. In motion level detection unit (65), indications of movement inside the monitored restricted space are formed. The formation is effected by accumulating To this end, arrays of initial radio images coming from initial radio image formation unit (63) are accumulated in motion level detection unit (65) during a time period $\Delta t$ (generally, 3-5 sec). Upon accumulation, standard deviation (STD) is calculated for each distance sample $R_j$:$STD_j$ 9. In threshold comparison unit (70), maximal value from all the distance samples is determined:

$$C_{max} = \max_j \{STD_j\}$$

The resulting value $C_{max}$ is compared with a threshold level $C_{nopoz}$ for detecting presence or absence of motion (of a human or animal) inside the restricted space. If threshold is exceed, criterion alive is formed which is transmitted in joint decision unit (12).

V. Joint Decision and Calibration

Joint Decision

Joint decision unit (12) provides a joint decision based on processed data from radar device (2) and optical device (3). FIG. 15 shows a flow chart of joint decision unit (12).

As shown in FIG. 15, joint decision unit (12) inter alia comprises object selection unit (73), compliance matrix formation unit (74), equivalent signal search unit (75), synthesized radio image formation unit (76), and threshold comparison unit (77).

In use:

1. An alarm signal is formed when one of the following conditions is met:

a) a living object (a human or animal) is detected.

A living object is detected when radar data processing unit (11) receives "alive"-signal: Alive=truth ?;

b) signal Bmax (maximum radio image for the current radar channel—cor_del_RPj) exceeds a predefined threshold C: Bmax>C.

c) general quantity (N) of objects detected by optical device (3) exceeds a predefined threshold: N>Nmax.

2. If none of the above specified conditions is met, the output from radar device and optical device is analyzed and, for each of the detected objects, an additional parameter "synthesized radio image": RPSi,j is formed, which is a functional analogue of radio image (cor_del_RPj) obtained in radar data processing unit (11).

3. In contrast to a synthesized radio image, a normal radio image is determined for a set of objects that are inside the restricted space. No components characteristic of each of the objects can be selected. In contrast, the synthesized radio image is formed for each individual object, thus providing better sensitivity. Instead of a total analysis for all of the objects, each detected can be analyzed individually to significantly increase accuracy of the made decision. For example, if many "allowable objects" are inside the monitored restricted space, they can cumulatively affect a formed radio image, which can exceed a predefined threshold which results in false alarming. A synthesized radio image (for each object), however, allows for an independent analysis of each detected object, thus avoiding false alarming. The synthesized radio image can be formed only by fusing data from both optical device (3) and radar device (2).

4. Formation of a synthesized radio image is initiated in object selection unit (73) which receives from optical data processing unit (10) the following sets of characteristics selected by using optical device (3):

$S_i$—area of the selected i-th object;

$r_i$—coordinates of the selected i-th object positioned along edges of the monitored restricted space;

N—total number of objects selected by optical device.

Based on these characteristics, a particular object is selected as input to compliance matrix formation unit (74).

5. In compliance matrix formation unit (74), a compliance matrix (MCi) is formed for the i-th object previously selected in object selection unit (73). This matrix is a two-dimensional binary matrix where the first variable is distance sample ($R_j$) of radar, wherein dimensionality of the distance sample is M; the second variable is number of the used radar channel, wherein dimensionality of the second variable is Kmax. The matrix yields either 1 or 0 which correspondingly means that the radar device does (for 1) or does not (for 0) sense a given object at a given distance sample ($R_j$) for a given radar channel (K). The matrix has the same dimensionality with that of the radio image formed for all the channels; therefrom, instead of using the radio image value, a compliance criterion of 1/0 is set to be used.

Thus, the compliance matrix as provided in this unit determines distances and channels for enabling radar device (2) to sense the given object. If the compliance matrix yields "0" for a given point (distance sample and current radar channel), radar device (2) will never sense the given object at this point. If the compliance matrix yields "1" for this point, radar device (2) can basically sense the object at this point; however, this is determined by characteristics of the object (particularly by its permittivity).

Compliance matrix formation unit (74) is disclosed in grater details with reference to FIG. 16.

6. Upon formation of compliance matrix for the selected i-th object, values of MCi are stored and condition: i=N? is checked, i.e. it is checked whether corresponding matrices MCi are provided for all the objects. If "not for all", a next object is selected to form MCi in a similar way.

7. Upon formation of MCi for all of the detected objects, equivalent signal search unit (75) searches equivalents signals for each object for each distance sample $R_j$: $S_{i,j}$ where S is a value of equivalent signal, I is a number of selected object, j is a number of distance sample. Equivalent signal (for a given object and a given distance sample) measures contribution of the object to the total radio image. $S_{i,j}$ can be determined by using the following expression:

$$\sum_{i=1}^{N} S_{i,j} \cdot MC_{i,j,k} = \text{cor\_del\_RP}_{j,k}$$

where $S_{i,j}$ are unknown variables: a value of equivalent signal for i-th object and j-th distance sample;

$MC_{i,j,k}$ is a binary value of compliance matrix (MC) for i-th object, j-th distance sample, and k-th number of radar channel;

cor_del_RP$_{j,k}$ is a value of radio image for j-th distance sample, and k-th number of radar channel.

8. In synthesized radio image formation unit (76), synthesized radio images (RPS$_i$(R$_j$)) are formed for each individual object by using value of equivalent signal $S_{i,j}$ obtained previously. Here, i is a current number of the selected object, variable R$_j$ means that values of the synthesized radio image are set for the same distance samples as for normal radio images.

9. In threshold comparison unit (77), each RPS$_i$(R$_j$) is analyzed by:
a) Selecting an object number and RPS$_i$(R$_j$) corresponding thereto;
b) Determining a maximum value for each of the distance samples (Rj): max{RPS$_i$(R$_j$)};
c) Comparing the maximum value with a predefined threshold: max {RPS$_i$(R$_j$)}>B$_{max}$?;
d) Checking analysis of all the objects (transition to a)).

Compliance Matrix Formation Unit

As shown in FIG. 16, compliance matrix formation unit (74) comprises object subdivision unit (80), initial compliance matrix formation unit (81), cell selection unit (82), compliance matrix selection unit (83), compliance matrix correction unit (84), 1. In object subdivision unit (80), a current object having area S$_i$, is subdivided into elementary cells {Sbl} used calibration of surface in the restricted space, such as,e.g., an elevator car. To this end, the area Si should be covered by a plurality of elementary cells {Sbl} so as to minimize intersection area in the cells. The plurality of elementary cells, thus provided, for cover is stored into a memory.

2. In initial compliance matrix formation unit (81), two-dimensional initial binary matrix is formed, wherein the matrix has dimensionality of Rmax (quantity of distance samples) by Kmax (quantity of radar channels): MCi, where index i corresponds to the current number of the selected object under analysis.

3. In cell selection unit (82), the next elementary cell is selected from the plurality of elementary cells {Sbl}.

4. In compliance matrix selection unit (83), a compliance matrix is selected for the current value of the elementary cell: MC_Sbl. The compliance matrix is selected from compliance matrix library comprising compliance matrices for all of the elementary cells which cover surface in the monitored restricted space. The compliance matrix library has been formed during initial calibration of the system, routinely performed once before using the system for monitoring a restricted space.

5. In compliance matrix correction unit (84), a current compliance matrix for analyzed object $S_i$, is corrected. In this case, MCi value is added (composed by "or") by compliance matrix received from the compliance matrix library:

MCi=MCi "or" MC_Sbl.

6. Upon analyses of all the selected elementary cells and taking into account compliance matrices corresponding thereto, a final value for the binary compliance matrix for object $S_i$, is produced, wherein the matrix has dimensionality of Rmax-by-Kmax. "0" for this matrix (for a particular distance sample and number of radar channel) means that the object does not affect radar device (2), i.e. radar device (2) cannot sense the object at the given distance sample. "1" means that, depending on the object characteristics (its permittivity), radar device (2) can sense the object at the given distance sample.

FIG. 17 shows a flow chart of calibration procedure for making compliance matrix library.

The purpose of the calibration procedure is to obtain a library of compliance matrices used in compliance matrix formation unit (74). The procedure is as follows:

1. In system initial setting unit (90), provisions are taken to cover the entire area of the inner surface inside the restricted space (such as an elevator car) by a reference element (an element having a reference area). Upon calibration, the reference element is sequentially applied such that the whole target surface is covered. The current position of the reference element is denoted as m (max {m}=M), and its coordinates are denoted as {Sb}m.

2. In referential cell coordinate selection unit (91), coordinates for a given position of the entire surface inside the restricted space are obtained for the current value m: {Sb}m.

3. In radio image formation unit (92), radio image is formed for a referential cell having the obtained coordinates: cor_del_RPm.

4. The formed value of cor_del_RPm is received in compliance matrix formation unit (93) which forms a binary compliance matrix MCm{R$_{j,k}$} according to the following rule:

if for a given distance sample R$_j$ and a given number of radar channel k:
cor_del_RPm(R$_{j,k}$)>=C_threshold, then MCm(R$_{j,k}$)=1;
if cor_del_RPm(R$_{j,k}$)<C_hresholdr, then MCm(R$_{j,k}$)=0.

5. The resulting value MCm (R$_{j, k}$) is stored in the compliance matrix library (94) at MC_Sbl.

6. Upon covering the entire surface inside the restricted space by sequential movement as described above (upon sequential selection of all the coordinates of the elementary cells), calibration is considered completed when the produced matrices are stored in the compliance matrix library.

What is claimed is:

1. A surveillance system for detecting the presence of unallowed objects in a restricted space, comprising:
    a radar having a data output and further comprising an electromagnetic wave transmitter having at least two output antennas commutated to the transmitter output by means of transmitter switch,
    an electromagnetic wave receiver having an output and at least two input antennas commutated to the receiver input by means of receiver switch,
    a control unit operating said transmitter and receiver switches to select a pair of one input antenna and one output antenna at any given time,
    a video camera adapted to take successive image frames of the restricted space,
    a signal processor having a radar data input, a camera data input and an output, and
    a storing device connected to the signal processor, wherein stored in the storing device are: reference data relating to the restricted area and obtained in the absence of any object in the restricted area, sets of parameters of allowed objects, and radar calibration data acquired during calibration process in which for each pair of input and output antennas a predefined test object is located in each radar resolution cell,
    the signal processor being adapted to detecting the presence of object images in image frames by their contours using the reference data, calculating parameters of each object image and then calculating radar cross-section corresponding to each detected object image using the radar calibration data from the storing device, and
    comparing calculated parameters of each object image detected in the restricted area image frame against each set of parameters of allowed objects and generating an alarm signal according to this comparison result.

2. The surveillance system of claim 1, wherein said signal processor is adapted to provide information about living objects for each antenna pair based on heartbeat or breathing movement detected in radar received signal.

3. The surveillance system of claim 1, wherein appropriate correction is given during radar data processing for vibration and deformations of the surveyed object.

4. The surveillance system of claim 1, wherein optical correction algorithm is performed on contours and areas.

5. The surveillance system of claim 1, wherein shadows are excluded from object images.

6. The surveillance system of claim 1, wherein the radar is an ultra wideband (UWB) radar.

7. The surveillance system of claim 1, wherein the signal processor and storing device are physically implemented on a printed circuit board.

8. The surveillance system of claim 1, wherein the signal processor and storing device are physically implemented on a silicon chip.

* * * * *